United States Patent
Paizis

(10) Patent No.: US 6,338,042 B1
(45) Date of Patent: Jan. 8, 2002

(54) METHOD AND APPARATUS FOR INTEGRATING COMPETENCY MEASURES IN COMPENSATION DECISIONS

(75) Inventor: James N. Paizis, Danville, CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/113,948

(22) Filed: Jul. 10, 1998

(51) Int. Cl.7 .............................................. G06F 17/60
(52) U.S. Cl. .................................. 705/11; 705/2; 705/7
(58) Field of Search .................... 705/11, 2, 7

(56) References Cited

U.S. PATENT DOCUMENTS

| | | | | |
|---|---|---|---|---|
| 5,706,441 A | * | 1/1998 | Lockwood ...................... 705/3 |
| 5,726,914 A | * | 3/1998 | Janovski et al. ............... 702/84 |
| 5,819,231 A | * | 10/1998 | Tremaine ........................ 705/7 |
| 5,909,669 A | * | 6/1999 | Havens .......................... 705/11 |
| 5,924,073 A | * | 7/1999 | Tyuluman et al. ............. 705/2 |

* cited by examiner

Primary Examiner—Forest Thompson, Jr.

(57) ABSTRACT

Methods and apparatus for incorporating measures of competency and contribution into pay decisions are disclosed. According to one aspect of the present invention, a computer-implemented method for automating compensation decisions includes obtaining indications of performance for a group of individuals in a common role. Relative rankings are produced for the group of individuals based at least in part upon an analysis of the indications of performance, and are compared to distribution data that is relevant to the common role. The comparison of the relative rankings to the distribution data is used to determine a suggested level of compensation for each individual in the group of individuals. In one embodiment, obtaining indications of performance for the group of individuals includes obtaining quantifications of competency and contribution for each of the individuals.

22 Claims, 9 Drawing Sheets

FIG. 5A

| | | | | | STEP 1 INPUT SCORES | | | STEP 2 VALIDATE RANKING | | |
|---|---|---|---|---|---|---|---|---|---|---|
| LAST NAME | FIRST NAME | CURRENT SALARY | EBR BASE | TTC | COMP SCORE ∇ | CONT SCORE ∇ | COMB SCORE | COMP RANK | CONT RANK | COMB RANK | FINAL RANK ∇ |
| Ford | Gerald | 47,700 | 1.19 | 1.05 | 5.36 | 1.25 | 5.74 | 1 | 1 | 1 | |
| Monroe | James | 38,160 | 0.95 | 0.84 | 5.28 | 1.25 | 5.71 | 3 | 1 | 2 | |
| Eisenhower | Dwight | 32,700 | 0.82 | 0.72 | 5.01 | 1.25 | 5.60 | 7 | 1 | 3 | |
| Lincoln | Abe | 47,280 | 1.18 | 1.04 | 5.30 | 1.20 | 5.42 | 2 | 4 | 4 | |
| Taft | William | 46,822 | 1.17 | 1.03 | 5.20 | 1.20 | 5.38 | 4 | 4 | 5 | |
| Madison | James | 47,352 | 1.18 | 1.04 | 5.02 | 1.20 | 5.31 | 6 | 4 | 6 | |
| Pierce | Franklin | 41,016 | 1.03 | 0.90 | 4.91 | 1.20 | 5.27 | 8 | 4 | 7 | |
| Van Buren | Martin | 36,240 | 0.91 | 0.80 | 4.83 | 1.20 | 5.23 | 10 | 4 | 8 | |
| Fillmore | Millard | 35,616 | 0.89 | 0.78 | 4.50 | 1.15 | 4.80 | 14 | 9 | 9 | |
| Hoover | Herbert | 45,504 | 1.14 | 1.00 | 5.12 | 1.05 | 4.45 | 5 | 11 | 10 | |
| Polk | James | 36,752 | 0.92 | 0.81 | 4.79 | 1.05 | 4.32 | 11 | 11 | 11 | |
| Grant | Ulysses | 49,140 | 1.23 | 1.08 | 4.01 | 1.10 | 4.31 | 19 | 10 | 12 | |
| Nixon | Richard | 48,408 | 1.21 | 1.06 | 4.62 | 1.05 | 4.25 | 12 | 11 | 13 | |
| Adams | John | 36,048 | 0.90 | 0.79 | 4.61 | 1.05 | 4.25 | 13 | 11 | 14 | |
| Bush | George | 38,160 | 0.95 | 0.84 | 4.40 | 1.05 | 4.16 | 16 | 11 | 15 | |
| Johnson | Lyndon | 43,273 | 1.08 | 0.95 | 4.29 | 1.05 | 4.12 | 17 | 11 | 16 | |
| McKinley | William | 35,016 | 0.88 | 0.77 | 4.89 | 1.00 | 4.06 | 9 | 18 | 17 | |
| Buchanan | James | 32,436 | 0.81 | 0.71 | 4.42 | 1.00 | 3.87 | 15 | 18 | 18 | |
| Roosevelt | Ted | 38,856 | 0.97 | 0.85 | 3.22 | 1.05 | 3.69 | 29 | 11 | 19 | |
| Wilson | Woodrow | 27,720 | 0.69 | 0.61 | 3.86 | 1.00 | 3.65 | 20 | 18 | 20 | |
| Carter | Jimmy | 40,884 | 1.02 | 0.90 | 4.15 | 0.95 | 3.46 | 18 | 22 | 21 | |
| Harding | Warren | 47,112 | 1.18 | 1.04 | 3.05 | 1.00 | 3.32 | 32 | 18 | 22 | |
| Jackson | Andrew | 47,628 | 2.38 | 1.05 | 3.26 | 0.95 | 3.11 | 27 | 22 | 23 | |
| Garfield | James | 36,000 | 0.90 | 0.79 | 3.51 | 0.90 | 2.91 | 23 | 25 | 24 | |
| Cleveland | Grover | 50,160 | 1.25 | 1.10 | 3.74 | 0.85 | 2.70 | 21 | 28 | 25 | |
| Taylor | Zachary | 28,704 | 0.72 | 0.63 | 2.98 | 0.90 | 2.69 | 34 | 25 | 26 | |
| Jefferson | Thomas | 25,920 | 0.65 | 0.57 | 2.01 | 0.95 | 2.61 | 41 | 22 | 27 | |

MRP(T) = 50,000
MRP(B) = 40,000
PMM = 4.0%
Budget = $ 31,563
FY Expense =
% Budget =
% Increase =
Comp Wt = 40%
Cont Wt = 60%

[Step 2] [Rank]
[Step 3] [Re-Rank]
[Step 4] [Modify]
[Note] [Report]

Role: President of the United States

STEP 1
Input Competency and Contribution scores from the individual scorecards in columns shown below. The tool will automatically calculate a weighted combined score. Proceed to Step 2.
∇ = USER INPUT REQUIRED STEP 2
Click on the RANK button to rank by Combined Score. Rankings appear in column J. Evaluate automatic rankings and make your final ranking choice in column K (fill all cells, not just the changes). Click RE-RANK button periodically to update final ranking. Proceed to Step 3.

FIG. 5B

| | | | | | | | STEP 3 |
|---|---|---|---|---|---|---|---|
| MRP(T) = | 50,000 | | | | | | As a starting point for your pay decisions, the tool has calculated an automated EBR derived from survey pay distribution for the role, based on each person's ranking within the group. The tool has also calculated the pay based on this EBR. If alteration of EBR is advisable, make changes in TARGET EBR column. Pay results will be reflected in TARGET PAY column. Proceed to Step 4. |
| MRP(B) = | 40,000 | | | | | | |
| PMM = | 4.0% | | | | Step 2 | Rank | |
| Budget = $ | 31,563 | | | | Step 3 | Re-Rank | |
| FY Expense = $ | 81,785 | | | | Step 4 | Modify | |
| % Budget = | 259% | | | | Note | Report | |
| % Increase = | 10.4% | | | | | | |
| Comp Wt = | 40% | | | | | | |
| Cont Wt = | 60% | | | | | | USER INPUT OPTIONAL - V |

| CURRENT STATUS | | | | | | | STEP 3 SET TARGETS | | | |
|---|---|---|---|---|---|---|---|---|---|---|
| LAST NAME | FIRST NAME | CURRENT SALARY | EBR BASE | TTC | CURRENT PAY RANK | AUTO EBR | AUTO PAY | TARGET EBR V | TARGET PAY | % INCREASE |
| Ford | Gerald | 47,700 | 1.19 | 1.05 | 6 | 1.30 | 52,000 | 1.30 | 52,000 | 9.0% |
| Monroe | James | 38,160 | 0.95 | 0.84 | 19 | 1.30 | 52,000 | 1.30 | 52,000 | 36.3% |
| Eisenhower | Dwight | 32,700 | 0.82 | 0.72 | 31 | 1.30 | 52,000 | 1.30 | 52,000 | 59.0% |
| Lincoln | Abe | 47,280 | 1.18 | 1.04 | 9 | 1.30 | 52,000 | 1.30 | 52,000 | 10.0% |
| Taft | William | 46,822 | 1.17 | 1.03 | 11 | 1.30 | 52,000 | 1.30 | 52,000 | 11.1% |
| Madison | James | 47,352 | 1.18 | 1.04 | 8 | 1.22 | 48,667 | 1.22 | 48,667 | 2.8% |
| Pierce | Franklin | 41,016 | 1.03 | 0.90 | 15 | 1.22 | 48,667 | 1.22 | 48,667 | 18.7% |
| Van Buren | Martin | 36,240 | 0.91 | 0.80 | 24 | 1.22 | 48,667 | 1.22 | 48,667 | 34.3% |
| Fillmore | Millard | 35,616 | 0.89 | 0.78 | 27 | 1.22 | 48,667 | 1.22 | 48,667 | 36.6% |
| Hoover | Herbert | 45,504 | 1.14 | 1.00 | 12 | 1.14 | 45,600 | 1.14 | 45,600 | 0.2% |
| Polk | James | 36,752 | 0.92 | 0.81 | 23 | 1.14 | 45,600 | 1.14 | 45,600 | 24.1% |
| Grant | Ulysses | 49,140 | 1.23 | 1.08 | 3 | 1.14 | 45,600 | 1.14 | 45,600 | -7.2% |
| Nixon | Richard | 48,408 | 1.21 | 1.06 | 4 | 1.14 | 45,600 | 1.14 | 45,600 | -5.8% |
| Adams | John | 36,048 | 0.90 | 0.79 | 25 | 1.07 | 42,800 | 1.07 | 42,800 | 18.7% |
| Bush | George | 38,160 | 0.95 | 0.84 | 19 | 1.07 | 42,800 | 1.07 | 42,800 | 12.2% |
| Johnson | Lyndon | 43,273 | 1.08 | 0.95 | 13 | 1.07 | 42,800 | 1.07 | 42,800 | -1.1% |
| McKinley | William | 35,016 | 0.88 | 0.77 | 30 | 1.07 | 42,800 | 1.07 | 42,800 | 22.2% |
| Buchanan | James | 32,436 | 0.81 | 0.71 | 32 | 1.07 | 42,800 | 1.07 | 42,800 | 23.3% |
| Roosevelt | Ted | 38,856 | 0.97 | 0.85 | 17 | 1.00 | 40,000 | 1.00 | 40,000 | 2.9% |
| Wilson | Woodrow | 27,720 | 0.69 | 0.61 | 36 | 1.00 | 40,000 | 1.00 | 40,000 | 44.3% |
| Carter | Jimmy | 40,884 | 1.02 | 0.90 | 16 | 1.00 | 40,000 | 1.00 | 40,000 | -2.2% |
| Harding | Warren | 47,112 | 1.18 | 1.04 | 10 | 0.94 | 37,600 | 0.94 | 37,600 | -20.2% |
| Jackson | Andrew | 47,628 | 2.38 | 1.05 | 7 | 0.94 | 37,600 | 0.94 | 37,600 | -21.1% |
| Garfield | James | 36,000 | 0.90 | 0.79 | 26 | 0.94 | 37,600 | 0.94 | 37,600 | 4.4% |
| Cleveland | Grover | 50,160 | 1.25 | 1.10 | 2 | 0.94 | 37,600 | 0.94 | 37,600 | -25.0% |
| Taylor | Zachary | 28,704 | 0.72 | 0.63 | 35 | 0.88 | 35,200 | 0.88 | 35,200 | 22.6% |
| Jefferson | Thomas | 25,920 | 0.65 | 0.57 | 39 | 0.88 | 35,200 | 0.88 | 35,200 | 35.8% |

| MRP(T) = | 50,000 |
| --- | --- |
| MRP(B) = | 40,000 |
| PMM = | 4.0% |
| Budget = $ | 31,563 |
| FY Expense = $ | 28,796 |
| % Budget = | 91% |
| % Increase = | 3.8% |
| Comp Wt = | 40% |
| Cont Wt = | 60% |

[ Step 2 ] [ Rank ]
[ Step 3 ] [ Re-Rank ]
[ Step 4 ] [ Modify ]
[ Note ] [ Report ]

STEP 4

Click on the MODIFY button to change target pay to fit within the designated budget. These changes are made uniformly, reducing all pay targets by the same percentage. Make final pay and timing decisions in FINAL PAY, and EFF CAL MONTH columns while monitoring budget impact. Enter effective month as calendar month 1-12. Final pay decisions may require multiple iterations. Use NOTE button if you want to record explanatory notes regarding any of the pay decisions. Save when complete.

CURRENT STATUS | STEP 4 EVALUATE AND FINALIZE

| LAST NAME | FIRST NAME | CURRENT SALARY | TARGET PAY | MODIFIED PAY | % INC | FINAL PAY | % INC | FINAL EBR(T) | LAST SAL CHG DATE | EFF CAL MONTH |
| --- | --- | --- | --- | --- | --- | --- | --- | --- | --- | --- |
| Ford | Gerald | 47,700 | 52,000 | $49,359 | 3.5% | $50,000 | 4.8% | 1.10 | 12/16/96 | 7 |
| Monroe | James | 38,160 | 52,000 | $43,501 | 14.0% | $43,500 | 14.0% | 0.96 | 6/1/97 | 7 |
| Eisenhower | Dwight | 32,700 | 52,000 | $40,148 | 22.8% | $40,000 | 22.3% | 0.88 | 11/1/96 | 7 |
| Lincoln | Abe | 47,280 | 52,000 | $49,102 | 3.9% | $49,000 | 3.6% | 1.08 | 12/16/96 | 9 |
| Taft | William | 46,822 | 52,000 | $47,859 | 4.3% | $49,000 | 4.7% | 1.08 | 8/1/97 | 8 |
| Madison | James | 47,352 | 48,667 | $47,859 | 1.1% | $47,352 | 0.0% | 1.04 | 1/9/95 | |
| Pierce | Franklin | 41,016 | 48,667 | $43,969 | 7.2% | $44,000 | 7.3% | 0.97 | 3/16/97 | 3 |
| Van Buren | Martin | 36,240 | 48,667 | $41,036 | 13.2% | $41,000 | 13.1% | 0.90 | 12/1/96 | 12 |
| Fillmore | Millard | 35,616 | 45,600 | $40,653 | 14.1% | $40,600 | 14.0% | 0.89 | 4/16/97 | 14 |
| Hoover | Herbert | 45,504 | 45,600 | $45,541 | 0.1% | $45,504 | 0.0% | 1.00 | 6/1/97 | |
| Polk | James | 36,752 | 45,600 | $40,167 | 9.3% | $40,000 | 8.8% | 0.88 | 1/1/97 | 1 |
| Grant | Ulysses | 49,140 | 45,600 | $49,140 | 0.0% | $49,140 | 0.0% | 1.08 | 12/1/96 | |
| Nixon | Richard | 48,408 | 45,600 | $48,408 | 0.0% | $48,408 | 0.0% | 1.06 | 3/16/97 | |
| Adams | John | 36,048 | 42,800 | $38,654 | 7.2% | $38,500 | 6.8% | 0.85 | 8/16/96 | 9 |
| Bush | George | 38,160 | 42,800 | $39,951 | 4.7% | $40,000 | 4.8% | 0.88 | 6/16/96 | 7 |
| Johnson | Lyndon | 43,273 | 42,800 | $43,273 | 0.0% | $43,273 | 0.0% | 0.95 | 9/1/97 | |
| McKinley | William | 35,016 | 42,800 | $38,020 | 8.6% | $38,000 | 8.5% | 0.84 | 1/1/97 | 8 |
| Buchanan | James | 32,436 | 40,000 | $35,355 | 9.0% | $35,500 | 9.4% | 0.78 | 10/16/96 | 10 |
| Roosevelt | Ted | 38,856 | 40,000 | $39,297 | 1.1% | $40,500 | 4.2% | 0.89 | 1/16/97 | 1 |
| Wilson | Woodrow | 27,720 | 40,000 | $32,459 | 17.1% | $30,000 | 8.2% | 0.66 | 7/1/97 | 7 |
| Carter | Jimmy | 40,884 | 40,000 | $40,884 | 0.0% | $40,884 | 0.0% | 0.90 | 12/16/96 | |
| Harding | Warren | 47,112 | 37,600 | $47,112 | 0.0% | $47,112 | 0.0% | 1.04 | 1/11/93 | |
| Jackson | Andrew | 47,628 | 37,600 | $47,628 | 0.0% | $47,628 | 0.0% | 1.05 | 7/1/97 | |
| Garfield | James | 36,000 | 37,600 | $36,617 | 1.7% | $36,000 | 0.0% | 0.79 | 10/14/96 | |
| Cleveland | Grover | 50,160 | 37,600 | $50,160 | 0.0% | $50,160 | 0.0% | 1.10 | 1/11/93 | |
| Taylor | Zachary | 28,704 | 35,200 | $31,211 | 8.7% | $30,000 | 4.5% | 0.66 | 10/1/96 | 8 |
| Jefferson | Thomas | 25,920 | 35,200 | $29,501 | 13.8% | $30,000 | 15.7% | 0.66 | 1/1/97 | 1 |

FIG. 5C

METHOD AND APPARATUS FOR INTEGRATING COMPETENCY MEASURES IN COMPENSATION DECISIONS

BACKGROUND OF THE INVENTION

1. Field of Invention

The present invention relates generally to tools which may be used in payment decisions. More particularly, the present invention relates to software applications which incorporate measures of competency and market data for use in payment decisions.

2. Description of the Related Art

In many organizations, the compensation of employees of the organization is assessed periodically in an effort to account for general employee performance, changes in the cost of living, and the seniority of the employees. Compensation systems are typically based on "salary grades," or predetermined pay ranges. Such compensation systems are often "seniority-based," as they are arranged primarily to reward individuals based upon their relative seniority in a position. In other words, a senior individual with a given job position will generally have a higher pay range and, hence, pay level, than a junior individual in the same type of job position. As a result, the competency of each individual in the job position may not be accounted for when pay level adjustments are to be made.

When competencies are to be considered in a determination of how the pay level of an individual is to be adjusted, the overall competency of the individual may be evaluated during an evaluation process such as a performance review. Once the competencies of the individual are evaluated, e.g., evaluated by the supervisor or the manager of the individual, the competencies are considered in light of an appropriate pay range. By way of example, an individual whose overall competencies are considered to be high may be assigned to a pay level in the upper half of the pay range associated with his seniority level.

FIG. 1 is a process flow diagram which illustrates one process of adjusting a pay level using measured competencies. The process 100 begins at step 102 in which competencies are measured through an evaluation process. The evaluation process generally includes a quantification of the performance of an individual in terms of the competency of the individual in his position. By way of example, for some positions, the competency of an individual may be evaluated based upon the technical proficiency of the individual, while for other positions, the competency may be evaluated based upon the communications skills of the individual. Typically, competencies are measured in terms of an evaluation of whether an individual is considered to be of "high competence," "average competence," or "low competence."

After the competencies are measured, a performance evaluation is obtained in step 106 using the competencies. In general, the performance evaluation is an overall summary of the measured competencies. For example, the performance evaluation of an individual with a majority of competencies in the "average competency" category may result in a "meets objectives" rating, while the performance evaluation of an individual with a majority of competencies in the "high competence" category may result in an "exceeds objectives" rating.

Once the performance evaluation is obtained, the performance evaluation is compared in step 110 to a pay range that is specific to the position, e.g., job, held by the individual. As will be appreciated by those skilled in the art, a pay range for a position typically serves as a guideline for what to pay individuals in the position, and includes a lower end and an upper end. Pay ranges for positions are often determined through market studies, and published for use by employers. A comparison of the performance evaluation of an individual against an appropriate pay range allows an evaluation to be made regarding what pay the individual should receive.

In step 114, a determination of a pay action is made. That is, comparing the performance evaluation with the pay range allows a determination to be made regarding how the pay of the individual is to be adjusted. By way of example, if the individual has a high performance evaluation, the pay of the individual may be adjusted towards the upper end of the pay range. Alternatively, if the individual has a relatively low performance evaluation, the pay of the individual may be adjusted towards the lower end of the pay range. Once a pay action is determined, the process of adjusting a pay level is completed.

The adjustment of pay levels based on measures of competencies is generally subjective, since any correlation between different pay ranges and the measures of competency is difficult to identify. As such, the value placed by the market on particular competencies associated with a position is generally unknown. Since particular competencies may be valued more than others in the market, determining an appropriate pay level for an individual, based on the market, may be difficult when the valuation of the competencies in the market is uncertain. Further, the market may also value specific levels of contribution, e.g., contributions to an organization or company. However, like the measures of competency, assessing the levels of contribution of an individual then determining the appropriate pay level for the individual based on the levels of contribution may be difficult since the value placed by the market on levels of contribution is typically unknown.

Therefore, what is desired is a method and an apparatus for readily incorporating measures of the competency and contribution of an individual into pay decisions. That is, what is needed it a method and an apparatus for integrating measures of competency, levels of contribution, and market data into decisions regarding suitable pay levels for individuals.

SUMMARY OF THE INVENTION

The present invention relates to integrating competency measures, levels of contribution, and market distribution data into compensation decisions. According to one aspect of the present invention, a computer-implemented method for automating compensation decisions includes obtaining indications of performance for a group of individuals in a common role. Relative rankings are produced for the group of individuals based at least in part upon an analysis of the indications of performance, and are compared to distribution data that is relevant to the common role. The comparison of the relative rankings to the distribution data is used to determine a suggested level of compensation for each individual in the group of individuals.

In one embodiment, obtaining indications of performance for the group of individuals includes obtaining quantifications of competency and contribution for each of the individuals. In such an embodiment, producing the relative rankings for the group of individuals may include processing the quantifications of competency and contribution for each of the individuals using a regression algorithm.

According to another aspect of the present invention, a method for incorporating a performance evaluation of a selected individual into a determination of a pay target for the selected individual, who is part of a group of individuals, includes obtaining a measure of competency for the selected individual that is determined during the performance evaluation, and reflects a level of competency of the selected individual. The measure of competency is processed, using a regression formula, to obtain an overall score, which is used to produce a relative ranking for the selected individual with respect to the group of individuals using the overall score. The pay target for the selected individual is then calculated using the ranking and the distribution data. In one embodiment, the method includes obtaining a measure of contribution for the selected individual that reflects a level of contribution by the selected individual, and processing the measure of contribution, in addition to the measure of competency, to obtain the overall score.

In another embodiment, computing the pay target for the selected individual includes computing a target market pay value for the selected individual using the ranking and the distribution data, and evaluating the target market pay value and available budget to determine the pay target. In such an embodiment, a revised target market pay value may be obtained, and evaluating the target market pay value and the available budget to determine the pay target includes evaluating the revised target market pay value.

These and other advantages of the present invention will be better understood upon reading the following detailed descriptions and studying the various figures of the drawings.

BRIEF DESCRIPTION OF THE DRAWINGS

The present invention may best be understood by reference to the following description, taken in conjunction with the accompanying drawings, in which:

FIGS. 5a–5c are a diagrammatic representation of a graphical user interface which allows a user to interact with a payment program in order to reach a payment decision in accordance with an embodiment of the present invention.

DETAILED DESCRIPTION OF THE EMBODIMENTS

Market data regarding pay levels is generally provided without a clear correlation between different pay ranges, measures of competency, and levels of contribution. As a result, the adjustment of pay levels based upon the measures of competency and levels of contribution is difficult, since the value placed by the market on particular competencies and levels of contribution associated with a position is essentially unknown. Particular competencies and levels of contribution may be valued more than others in the market. However, since the valuation of the competencies and contribution is uncertain with respect to market data, determining an appropriate pay level for an individual based on the market valuation for specific competencies and levels of contribution, is not an easy task. Hence, the pay levels chosen may not accurately reflect the market valuations for specific competencies and contributions.

Comparing a ranking distribution, which is created using performance evaluations of a group of individuals who have substantially the same role in an organization, against a market distribution for pay levels associated with the role enables pay decisions to be more accurately based upon the market valuations for the competencies and the contributions of the individuals. Specifically, performance evaluations may be used to assess competencies and levels of contributions, which may then be used to rank the individuals with respect to one another. Once a ranking of the individuals is completed, the rankings may effectively be compared against a market distribution of pay levels in order to facilitate the determination of appropriate pay levels, based upon competencies and levels of contribution, for the individuals. In general, the generation of rankings, as well as the comparison of the rankings to a market distribution may be automated, i.e., performed by a computer system.

Figure 1:
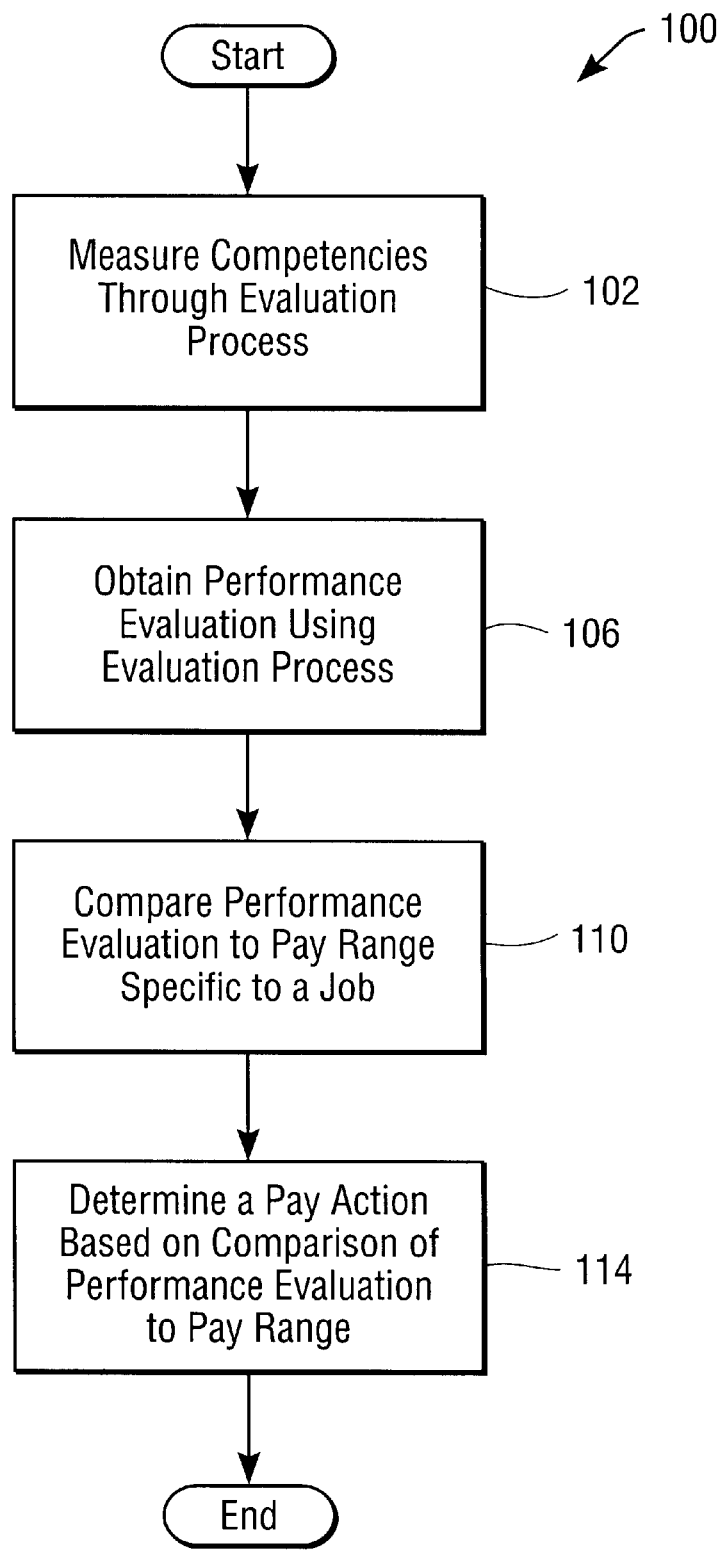
FIG. 1 is a process flow diagram which illustrates the steps associated with adjusting a pay level using measured competencies.
Figure 2:
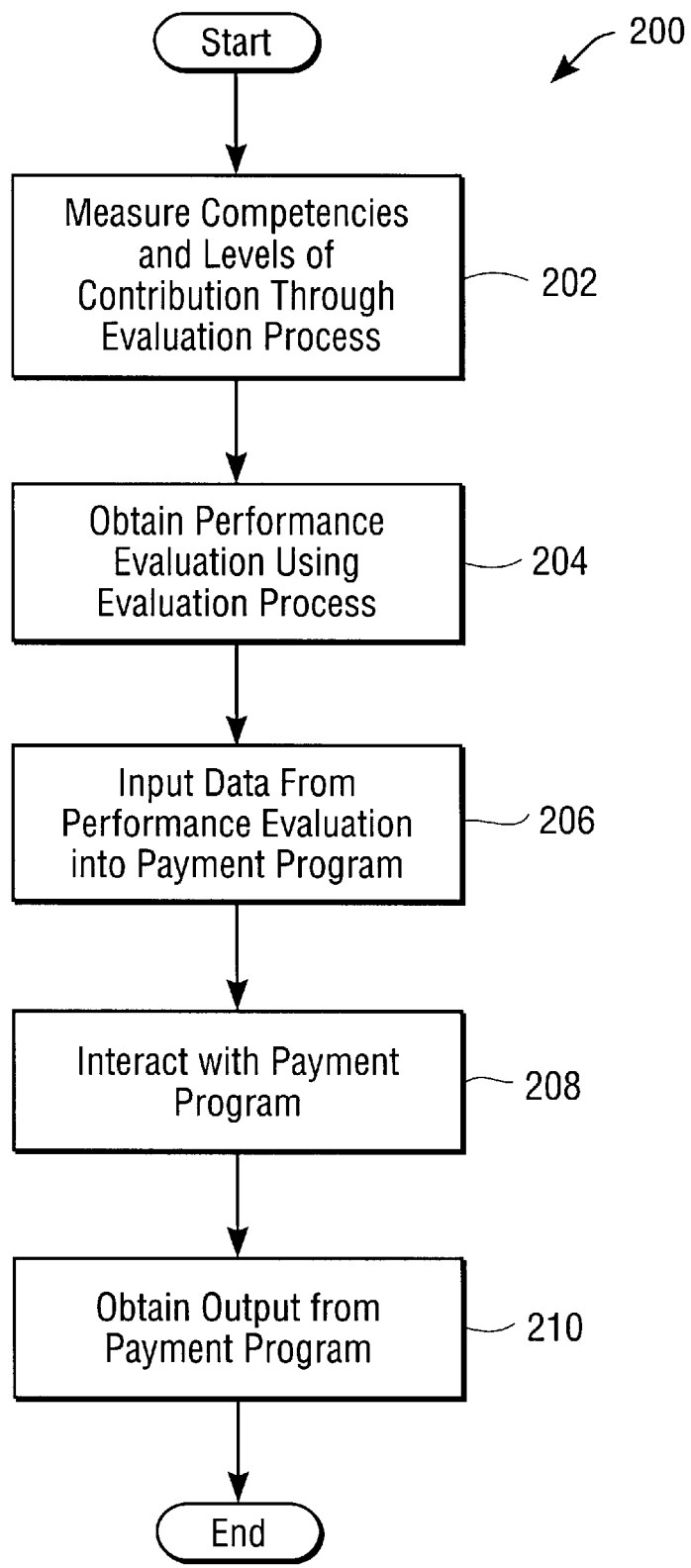
FIG. 2 is a process flow diagram which illustrates the steps associated with determining a pay level using measured competencies and levels of contribution in accordance with an embodiment of the present invention.

With reference to FIG. 2, the use of measured competencies and levels of contribution in determining a pay, or compensation, level will be described in accordance with an embodiment of the present invention. FIG. 2 is a process flow diagram which illustrates the steps associated with determining a target pay level using measured competencies and levels of contribution. The process 200 begins at step 202 in which the competencies and the levels of contribution of individuals are measured through an evaluation process. Typically, the individuals all hold essentially the same type of position, i.e., the individuals have the same basic role. Although evaluation processes may be widely varied, evaluation processes generally involve rating the perceived competency and contribution level of an individual in his position.

The measures of competency and contribution level often vary depending upon the characteristics of a particular position. In other words, different types of positions may have different measures of competency and levels of contribution. By way of example, measures of competency associated with a support staff position may include typing speed, the ability to work with others, and the ability to work with minimal direction, while levels of contribution may include contributions to leadership. Alternatively, measures of competency associated with a technical staff position may include scientific ability, and the ability to supervise others, while levels of contribution may include contributions to overall business results, or goals. As will be appreciated by those skilled in the art, the measures of competency and levels of contribution often result in ratings of "high," "average," and "low," although the ratings may also be based on a numerical scale.

Once the competencies and levels of contribution are measured, a performance evaluation is obtained in step 204 using an evaluation process. Generally, the performance evaluation outputs overall numerical scores which are generated by tabulating the measures of competency and the levels of contribution. Specifically, in one embodiment, a competency score and a contribution score are generated using any suitable computer application. In the event that the measures of competency and the levels of contribution are not numerically based, numerical equivalents of the measures of competency and the levels of contribution may be generated to obtain numerical scores for the performance evaluation. Such numerical equivalents may be generated, for example, by establishing a mapping between particular ratings and a numerical scale.

After data, e.g., numerical scores, are obtained through the evaluation process in step 204, process flow moves to step 206 where the data are inputted into a payment program. The data may either be inputted automatically, e.g., directly transferred from an evaluation program, or inputted manually, e.g., inputted into the payment program by a user. The payment program is arranged to receive the data, and to produce an output which reflects payment decisions for substantially all the individuals whose competencies and levels of contribution were measured during the evaluation process. The execution of the payment program will be described below with reference to FIGS. 3a and 3b.

In the described embodiment, a user interacts with the payment program in step 208. By interacting with the payment program, the user may make adjustments to the information contained in the program, as appropriate. Although the adjustments made may be widely varied, some potential adjustments will be discussed below with reference to FIGS. 3a and 3b. Once the user interacts with the payment program as desired, output is obtained from the payment program in step 210. The output obtained typically includes information regarding a target pay level, or a payment schedule, for each individual. After the pay level information is obtained, the process of determining a target pay level using measured competencies and levels of contribution is completed.

Figure 3A:
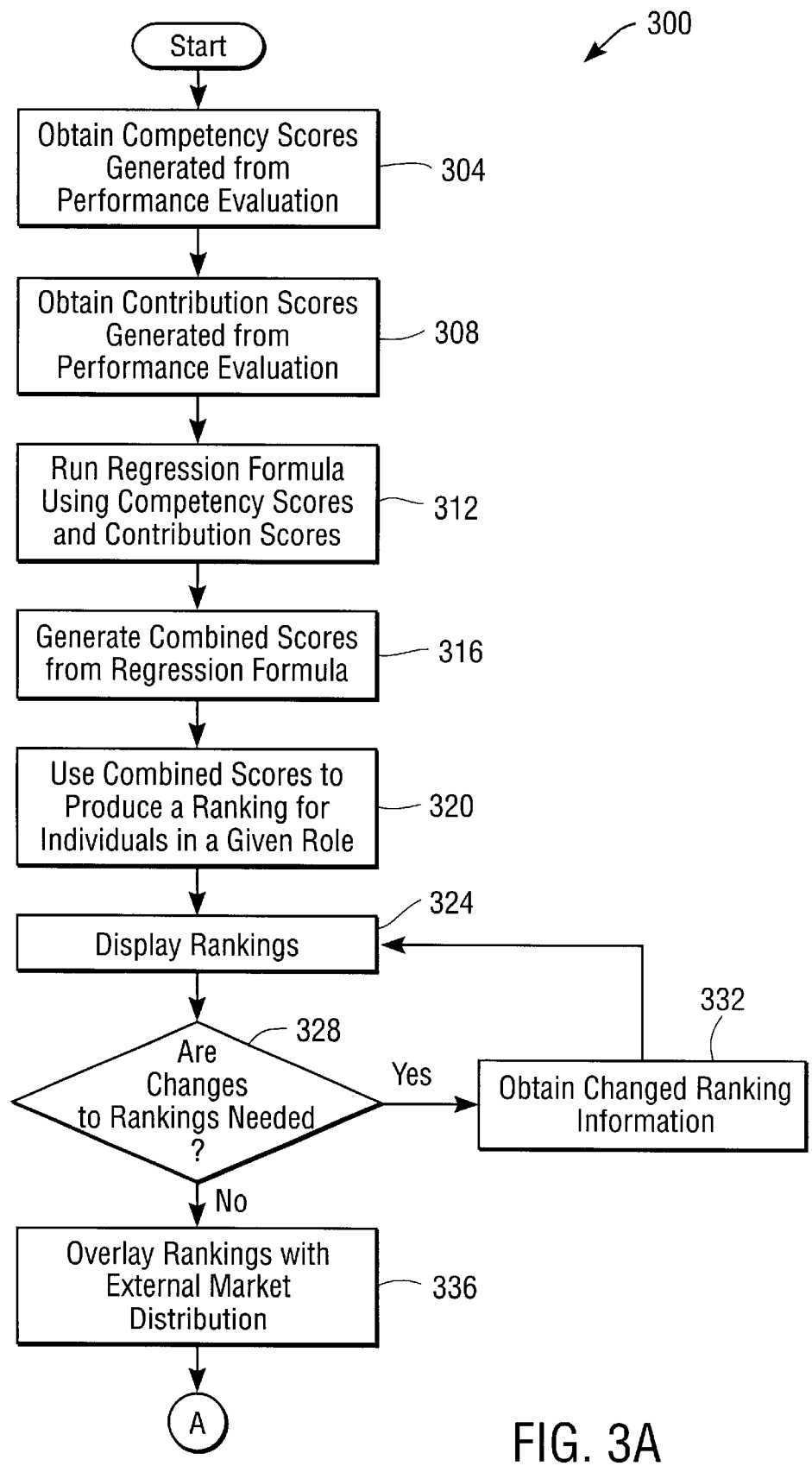
FIGS. 3a and 3b are a process flow diagram which illustrates the steps associated with the execution of a payment program in accordance with an embodiment of the present invention.
Figure 3B:
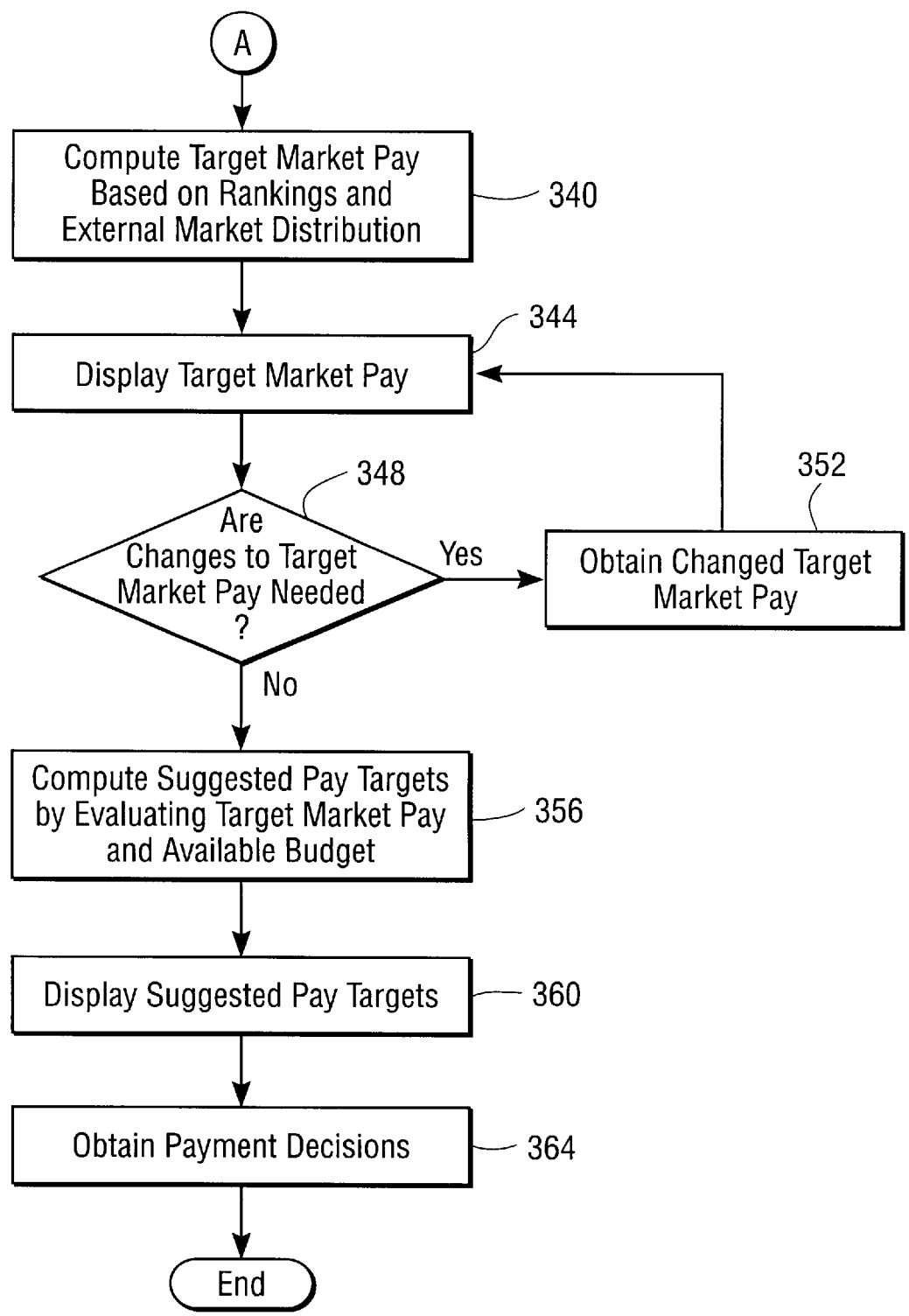
Figure 4:
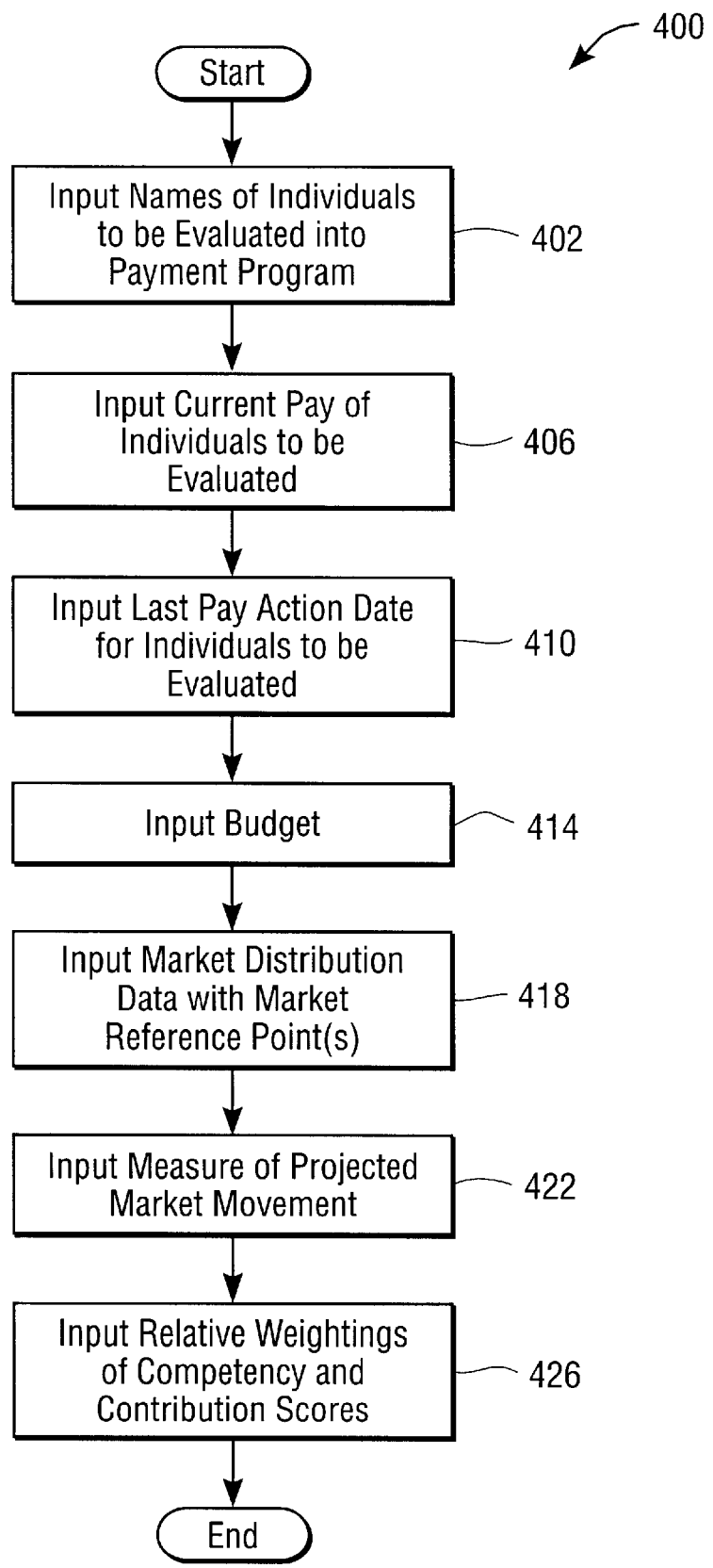
FIG. 4 is a process flow diagram which illustrates the steps associated with the initialization of a payment program in accordance with an embodiment of the present invention.

A payment program which uses data from performance evaluations in order to determine pay levels for individuals in a particular position is generally arranged to process the results of the performance evaluations, and to suggest suitable pay levels. FIGS. 3a and 3b represent a process flow diagram which illustrates the steps associated with the execution of a payment program in accordance with an embodiment of the present invention. It should be appreciated that prior to the execution of the payment program, the payment program may be initialized. Specifically, in the described embodiment, information such as competency and contribution score weightings, as well as external market distribution data, may be provided to the payment program prior to execution. One method of initializing the payment program will be described below with respect to FIG. 4.

The execution 300 of a payment program begins at step 304 in which competency scores, which are typically generated from a performance evaluation, are obtained. The competency scores, as discussed above, are arranged to reflect the overall perceived competency of individuals in a position, or role. Although the competency scores may be obtained from a software program, in one embodiment, the competency scores are obtained through direct input from a user. That is, a user may directly input information through a graphical user interface (GUI), as will be discussed below with reference to FIGS. 5a–5c.

In step 308, contribution scores, which reflect the overall perceived levels of contribution of individuals in a position and are generated from a performance evaluation, are obtained. Like the competency scores, the contribution scores may be obtained through direct input from a user. Once the contribution scores are obtained, the competency scores and the contribution scores are processed using a regression formula in step 312. In general, the regression formula or, more generally, regression algorithm, is arranged to produce a weighted, combined score for each individual. As the regression formula is based upon the relative importance placed upon contribution scores and competency scores, the regression formula may vary widely. Typically, however, the regression formula is of the following form:

combined score=(contribution score)*(contribution weight)*(contribution constant)+(competency score)*(competency weight)*(competency constant)+(overall constant)

While the weights and the various constants may have substantially any value, in the described embodiment, the sum of the weights, e.g., the contribution weight and the competency weight, is one.

Processing the competency scores and the contribution scores using the regression formula yields a combined score for each individual in step 316. The combined scores are then used in step 320 in order to produce a relative ranking for all the individuals, i.e., all the individuals in the given role. That is, individuals of a given role are ranked according to their respective competency scores.

The rankings are displayed in step 324 such that a user may review the rankings. The rankings are typically displayed as part of a GUI for the payment program that enables a user to modify the rankings, in the event that the user deems that the rankings should be adjusted. When a user decides that changes to the rankings are necessary, the user effectively notifies the payment program that changes are necessary. Although such a notification may occur in substantially any manner, in one embodiment, the notification involves providing a suitable input to the payment program.

A determination is made in step 328 by the payment program regarding whether changes to the rankings are needed. In other words, it is determined whether a user has provided an indication that changes are to be made to the rankings. When the determination is that the rankings are to be changed, the changed ranking information is obtained in step 332. The changed ranking information may be obtained through user input into the payment program. After the changed ranking information is obtained, process flow returns to step 324 where the revised rankings are displayed.

When the determination in step 328 is that no changes to the rankings are needed, the implication is that a user has indicated that the rankings are acceptable. Such an indication may be provided to the payment program through direct input from the user, e.g., into an associated GUI. If no changes are needed to the rankings, then the rankings are overlaid with an appropriate external market distribution in step 336. That is, a comparison is made between the rankings and the external market distribution, which is a pay distribution in the market for a given position. The external market distribution is typically inputted into the payment program during initialization of the payment program, as will be discussed below with reference to FIG. 4.

After the rankings are overlaid with the external market distribution, a target market pay for each ranked individual is computed in step 340 based on the rankings and the external market distribution. In one embodiment, calculating the target market pay for an individual includes determining an employee benchmark ratio (EBR) for each individual. Employee benchmark ratios may be determined by correlating rankings to an external market distribution such that an individual, who is identified as a "median" individual, has an employee benchmark ratio of approximately one. Accordingly, the highest ranked individual may have an employee benchmark ratio that is correlated to the highest pay in the external market distribution, while the lowest ranked individual may have an employee benchmark ratio that is correlated to the lowest pay in the external market distribution. The target pay for each individual may then be computed by multiplying a median pay from the external market distribution by the employee benchmark ratio associated with the individual.

Once the target market pay for each individual is computed, the target market pay for the individuals is then displayed in step 344. By displaying the target market pay, a user may then determine whether modifications to the target market pay are desired. Modifications may be desired in the event that the target market pay for a particular individual appears to be too high, for example.

A determination is made in step 348 as to whether changes to target market pay are needed. In other words, it is determined whether a user has provided an indication that modifications are to be made to the target market pay for any individuals. When the determination is that the target market pay for some individuals is to be changed, the appropriate information is obtained in step 352. In one embodiment, the information may be obtained through user input into a GUI associated with the payment program. After the changed target market pay information is obtained, process flow returns to step 344 where the revised rankings are displayed.

When it is determined in step 348 that no changes are to be made to the target market pay for any individual, then process flow moves to step 356 in which suggested pay targets, or modified pay levels, are computed. Suggested pay targets are, in the described embodiment, pay levels that encompass pay increases, or decreases, to be attained by a given date. In other words, suggested pay targets generally reflect a schedule of anticipated pay increases, or decreases. An evaluation of target market pay generally includes a comparison of target market pay against the budget that is available to allocate pay increases. The available budget is often inputted into the payment program during the overall initialization process of the payment program, as will be discussed below with respect to FIG. 4.

Once suggested pay targets are computed, the suggested pay targets are displayed in step 360. Displaying the suggested pay targets allows a user to study the suggested pay targets, and to make a determination of whether the suggested pay targets are acceptable. In step 364, payment decisions are obtained from a user. Payment decisions may be based upon percentages of pay increase, as well as other factors which may include, but are not limited to, the time period over which a pay increase is to occur and the available budget. Obtaining payment decisions may involve receiving an indication from the user that the suggested pay targets are acceptable. Alternatively, obtaining the payment decisions may involve processing, or otherwise incorporating, changes to suggested pay targets. After payment decisions are obtained, the process of executing a payment program is completed.

As previously mentioned, prior to the execution of the payment program, the payment program may be initialized. In other words, the payment program may be set up for execution. The processes used to initialize the payment program may vary widely, depending upon the requirements of specific users. One suitable process for initializing the payment program in accordance with an embodiment of the present invention will be discussed with reference to FIG. 4. A process 400 of initializing a payment program begins at step 402 in which the names of individuals to be evaluated are inputted into the payment program. Specifically, in one embodiment, the names of individuals with a common role, or position, may be inputted into the payment program.

In general, names, as well as other inputs, may be entered into the payment program through a GUI that is associated with the payment program. That is, a user may interface with the GUI to provide information used to initialize the payment program. Alternatively, however, input to the payment program may be obtained from a data file. When input is obtained from a data file, the payment program effectively reads in the data contained within the data file.

After the names of the individuals are inputted, the current pay for each individual to be evaluated is inputted in step 406, and the last pay action date for each individual is inputted in step 410. The last pay action date is generally the date on which an individual last received a pay raise, or a pay cut. Inputting the last pay action dates into the payment program allows payment decisions to be based upon when an individual last received a pay adjustment. By way of example, an individual who might otherwise have received a pay increase may not receive an increase, if it is determined that the individual was recently allocated a pay increase.

Once the last pay action date for each individual is inputted in step 410, the available budget allocated to pay the individuals in the given role is inputted in step 414. Then, in step 418, market distribution data, e.g., an external market distribution, associated with the given role is inputted into the payment program. Such market distribution data may be obtained through conducting surveys of pay levels. Typically, multiple labor market surveys, including pay level surveys by industry and geography, may be used to gather market distribution data.

In the described embodiment, the market distribution data includes at least one market reference point (MRP). A market reference point is generally an approximate midpoint pay level value in the market distribution. When more than one market reference point is used, a "top" market reference point represents an upper limit on the mid-point for a role, while a "bottom" market reference point represents a lower limit on the mid-point for a role.

After the market distribution data is inputted, then in step 422, a measure of projected market movement (PMM) is inputted into the payment program. The projected market movement typically uses survey data to project the role-specific movement of the market over a particular time period, e.g., twelve months. In one embodiment, subsequent calculations of target pay that are made using the payment program account for projected market movement as well as external market distribution.

A measure of the projected market movement may be expressed as a percentage, e.g., a percentage increase in market reference points.

Once the measure of projected market movement is inputted, the relative weightings of competency scores and contribution scores are inputted in step 426. The weightings are arranged to reflect the relative importance of the competency scores and the contribution scores with respect to an overall combined score. As mentioned above, while the weightings may be widely varied, the weightings are typically such that the competency weighting and the contribution weighting sum up to one, or one-hundred percent. After the relative weightings are inputted, the payment program is considered to be initialized.

The payment program may be created using a variety of different computer programming languages. Alternatively, the payment program may be created in spreadsheet format, such that different inputs and results may be readily viewed.

When the payment program is created in spreadsheet format, a GUI that allows a user to interact with the payment program is readily created. In one embodiment, the payment program is created using as a spreadsheet program using a software application such as Excel, which is available commercially from Microsoft, Inc. of Redmond, Washington.

FIGS. 51a–5c are a diagrammatic representation of a GUI associated with a spreadsheet for a payment program which allows a user to interact with a payment program in order to reach a payment decision in accordance with an embodiment of the present invention. In the described embodiment, a GUI 500 is arranged such that a user may scroll through GUI 500 in order to view different portions of GUI 500. It should be appreciated, however, that in some embodiments, a GUI may be arranged such that different portions of the GUI are displayed as different, e.g., separate, screens or windows.

GUI 500 includes a current status section 502 which shows information obtained by the associated payment program during initialization. Such information includes the names of individuals, as well as the current salary of the individuals. In the embodiment as shown, current status section 502 also includes employee benchmark ratios for the individuals. The employee benchmark ratios are expressed as a ratio of the current salary of an individual to the appropriate market reference points.

In general, GUI 500 also includes a command section 504 and an instruction section 508. As shown, command section 504 includes "buttons" 512 that are arranged to be selected by a user, as for example by "clicking" on buttons 512 using a computer input/output device such as a mouse. Selecting buttons 512 causes actions to be performed. As will be appreciated by those skilled in the art, the selection of various buttons 512 may cause actions to be accepted, and macros to execute. Selection of "step" buttons, i.e., buttons 512a–c, allows a user to display different portions of GUI 500. When selected, "report" button 512h allows a summary of information displayed in GUI 500 to be viewed. The summary information may be viewed on a computer screen, printed to a printer, or saved as a text file. "Note" button 512d is arranged such that, when selected, a user may make annotations, e.g., explanatory notes regarding pay decisions. The notes, in one embodiment, may be stored in a text file.

Instruction section 508 display instructions used to implement different steps associated with a pay program. For instance, one step of the pay program may include inputting competency scores and contributions scores, as discussed above with respect to FIGS. 3a and 3b. Competency scores and contribution scores are inputted by a user into a competency score column 516 and a contribution score column 518, respectively. Once the scores are inputted, a regression formula is automatically invoked to compute a combined score, which is displayed in a combined score column 520.

Overall rankings may be displayed for the individuals listed in current status section 502 when a user selects "rank" button 512e. A competency rank column 522 displays relative competency rankings for each individual based on competency scores displayed in column 516, while a contribution rank column 524 displays relative contribution rankings for each individual based on competency scores displayed in column 518. Relative combined rankings, which reflect combined scores displayed in combined score column 520, are displayed in a combined rank column 526.

A user is allowed to interface with GUI 500 to enter revised rankings into a final rank column 528. Once the revised rankings are entered, e.g., typed, into final rank column 528 by the user, the user may select "re-rank" button 512f to essentially accept the changes to the combined score rankings displayed in combined rank column 526. In general, the rankings entered in final rank column 528 may be updated as often as desired.

By selecting button 512b, in the described embodiment, instruction section 508 is updated to display information associated with viewing and manipulating the target pay of each individual. In addition, GUI 500 is updated to show columns 530, 532, 534, 536, 538, 540. Column 520 displays a current pay rank for each individual, while column 532 displays an employee benchmark ratio for each individual. The employee benchmark ratios shown in column 532 are calculated by the payment tool. The suggested target pay levels associated with the employee benchmark ratios displayed in column 532 are shown in pay level column 534.

When a user wishes to revise the employee benchmark ratios and, hence, the suggested target pay levels, the user may input revised employee benchmark ratios in target employee benchmark ratio column 536. Revised target pay levels, based on the revised employee benchmark ratios in target employee benchmark ratio column 536, are shown in column 538. It should be appreciated that if no revised target employee benchmark ratios are inputted in column 536, then, in the described embodiment, column 538 is arranged to display substantially the same values as displayed in column 534. That is, the revised target pay levels are then effectively the same as the suggested target pay levels. Percentage increase column 540 displays the percentage difference between the current salary of an individual and the target pay level for the individual, as displayed in column 538.

After the target pay for the individuals listed in current status section 502 is computed, by selecting button 512c, instruction section 508 displays instructions pertaining to the evaluation and the finalization of pay decisions. As shown, the selection of button 512c also refreshes current status section 502 such that the target pay for each individual is displayed in current status section 502.

The selection of "modify" button 512g causes a modified pay level for each individual to be displayed in a modified pay column 548, as shown in Figure 5c. Modified pay levels are generally computed based upon the budget available for pay increases. Hence, the modified pay levels are effectively suggested pay targets which are based upon available budget. By way of example, when the percentage increases in pay for the individuals in the given position may not be met by the available budget, the pay levels may be modified, e.g., scaled, such that the available budget is not exceeded. It should be noted that in the described embodiment, modified pay levels are set such that the modified pay for an individual is not lower than the current salary of the individual. In other words, the lowest pay increase is approximately zero percent. The percentage difference between the current salaries of individuals and the modified pay levels is shown in a percentage increase column 550.

A final pay column 552, i.e., a final suggested pay column, in GUI 500 is arranged to accept modified final pay decisions from a user. In one embodiment, if no modified final pay decision is entered in final pay column 552, final pay column 552 is arranged to display the modified pay for each individual, as listed in column 548. The percentage difference between current salaries and pay targets is displayed in a column 554, and employee benchmark ratios, as calculated with respect to the final suggested pay level, are displayed in a column 556. When a top market reference point and a base market reference point are available, the employee benchmark ratio may be taken with respect to either market reference point.

Dates associated with the last date on which each individual had his pay level, or salary, adjusted is shown in a column 558. A effective calendar month column 560 is arranged to accept user input regarding the month in which each individual is to have his pay level adjusted to reflect the appropriate final suggested pay displayed in column 552.

Figure 6:
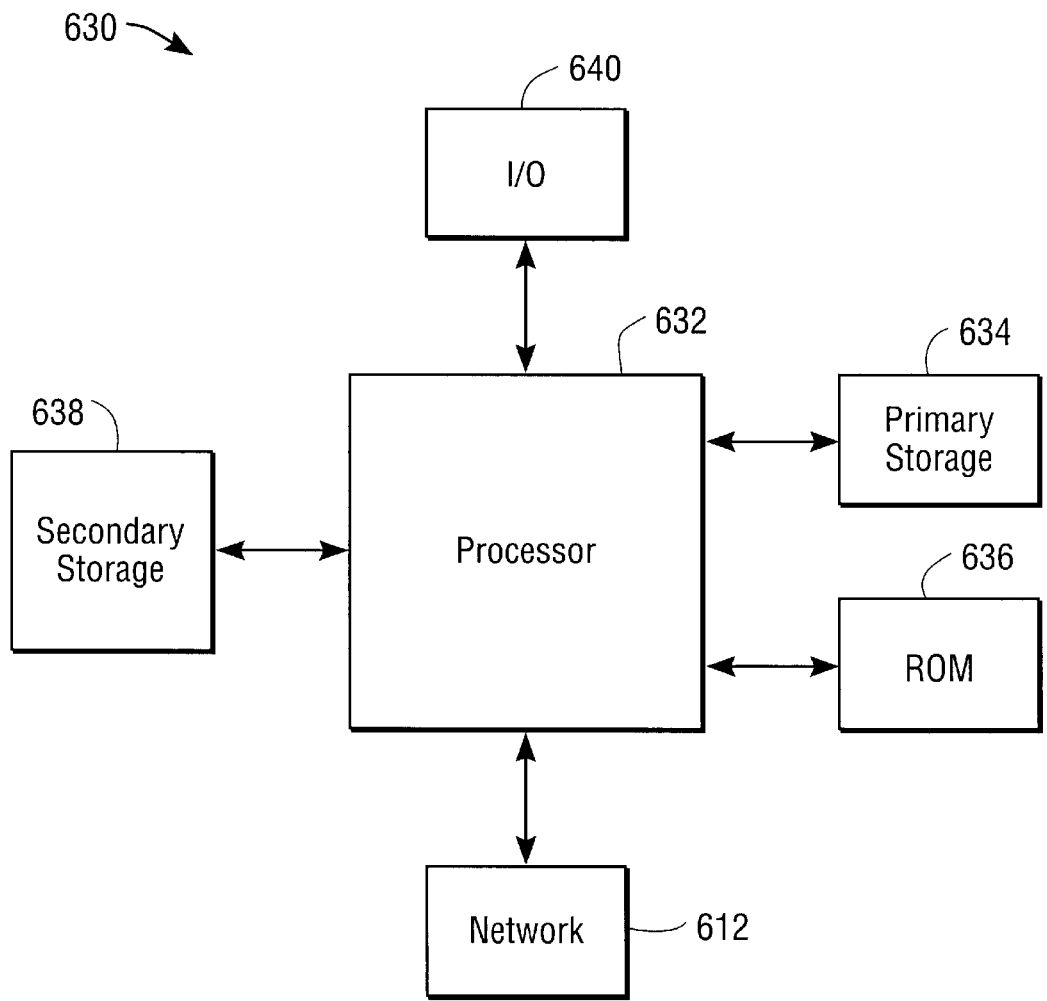
FIG. 6 is a diagrammatic representation of a computer system that is suitable for implementing the present invention.

In general, a payment program may be implemented on any suitable computer system. FIG. 6 illustrates a typical, general-purpose computer system suitable for implementing the present invention. Computer system 630 includes a processor 632, which is also referred to as a central processing unit, or CPU. CPUs 632 is coupled to memory devices which include, but are not limited to, a first primary storage device 634 that is typically a random access memory, or RAM, and a second primary storage device 636 that is typically a read only memory, or ROM.

ROM 636 acts to transfer data and instructions unidirectionally to the CPU 632, while RAM 634 is used typically to transfer data and instructions in a bi-directional manner, as will be appreciated by those skilled in the art. Both primary storage devices 634 and 636 may include any suitable computer-readable media. A secondary storage medium 638, which is typically a mass memory device, is also coupled bi-directionally to CPU 632 and provides additional data storage capacity. Mass memory device 638 is a computer-readable medium that may be used to store programs including computer code, data, and the like. Typically, mass memory device 638 is a storage medium such as a hard disk, a tape, or a CD-ROM, which is generally slower than primary storage devices 634 and 636. In one embodiment, mass memory storage device 638 may include a secure database. It will be appreciated that the information retained within mass memory device 638, may, in appropriate cases, be incorporated in standard fashion as part of RAM 634 as virtual memory.

CPU 632 is also coupled to one or more input/output devices 640 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Such input/output devices 640 facilitate interaction between a user and a payment program which is implemented with respect to computer system 630. Finally, CPU 632 optionally may be coupled to a computer or telecommunications network, e.g., an internet network or an intranet network, using a network connection as shown generally at 612. With such a network connection, it is contemplated that the CPU 632 might receive information from a server machine, or might output information to the server machine in the course of performing the above-described method steps. Such information, which is often represented as a sequence of instructions to be executed using CPUs 632, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the invention. By way of example, an initialization process for a payment program has generally been described in terms of a user directly inputting "background" information into the payment program. It should be appreciated, however, that an initialization process may instead involve downloading a file, e.g., from a database of files, which includes relevant background information such that the file may be incorporated, or read, into the payment program. Alternatively, an initialization process may be eliminated if user input is provided, or a data file is incorporated, as the payment program is being executed.

A payment program has been described in terms of being implemented in a spreadsheet format. However, the payment program may generally be implemented in a variety of different formats. For instance, the payment program may be implemented in a menu-driven format such that a user is prompted for each entry that is made into the payment program.

While a payment program of the present invention is suitable for use in aiding users, e.g., managers, in formulating payment decisions, it should be appreciated that the payment program may be modified for other purposes. By way of example, the payment program may be modified for use in determining the amount of loans individuals may be granted. When the payment program is arranged to aid in loan decisions, the external market distribution data may be data regarding the amount of loans typically granted to individuals of a given role.

In one embodiment, a performance evaluation for an individual may be incorporated as a part of a payment program. That is, the payment program may include the capability for evaluating an individual. In such an embodiment, an individual may not be ranked with respect to a given role, as the payment program may be executed with respect to that individual alone. As such, a payment decision may be obtained based substantially only on the performance of the individual and external market distribution data.

Although payment decisions have been described as accounting for both measures of competency and levels of contribution, it should be appreciated that the payment decisions may not necessarily incorporate both measures of competency and levels of contribution. That is, some payment decisions may use only measures of competency, while others may use only levels of contribution, without departing from the spirit or the scope of the present invention. Alternatively, other payment decisions may involve factors in addition to measures of competency and levels of contribution. Such factors may include, but are not limited to, the relative seniority of an individual and the pay history of the individual.

Further, the steps associated with executing a payment program in accordance with the present invention may vary. Steps may generally be altered, reordered, added, and removed without departing from the spirit or the scope of the present invention. By way of example, the steps associated with obtaining competency scores and contribution scores may be combined such that the scores may be obtained substantially simultaneously. In one embodiment, after suggested pay targets are computed and displayed, the suggested pay targets may be modified based upon the available budget, prior to obtaining payment decisions are from a user. That is, suggested pay targets may be modified as long as the modified pay targets fit within the available budget. Additionally, various error checking steps may be implemented, as for example to determine whether an input to the payment program is valid without departing from the spirit or the scope of the present invention. Therefore, the present examples are to be considered as illustrative and not restrictive, and the invention is not to be limited to the details given herein, but is defined by the appended claims and their full scope of equivalents.

What is claimed is:

1. A computer-implemented method for automating compensation decisions, the computer-implemented method comprising:

obtaining indications of performance for a group of individuals, the individuals being associated with a common role, wherein the indications of performance are arranged to quantify the performance of the individuals with respect to the common role;

obtaining distribution data, the distribution data being relevant to the common role;

producing relative rankings for the group of individuals based at least in part upon the indications of performance, wherein producing the relative rankings includes analyzing the indications of performance;

identifying a reference point in the relative rankings, the reference point being approximately a median ranking in the relative rankings, wherein the reference point is arranged to facilitate a comparison between the relative rankings and the distribution data;

determining a suggested level of compensation for each individual in the group of individuals based on the comparison of the relative rankings to the distribution data; and generating a display, the display including a representation of the suggested level of compensation for each individual in the group of individuals.

2. A computer-implemented method as recited in claim 1 wherein obtaining indications of performance for the group of individuals includes obtaining quantifications of competency and contribution for each of the individuals included in the group of individuals.

3. A computer-implemented method as recited in claim 2 wherein producing the relative rankings for the group of individuals includes processing the quantifications of competency and contribution for each of the individuals included in the group of individuals using a regression algorithm.

4. A computer-implemented method as recited in claim 1 wherein obtaining the indications of performance includes receiving the indications of performance from a user through a graphical user interface.

5. A computer-implemented method as recited in claim 1 wherein comparing the relative rankings to distribution data includes:

determining a median distribution value, the median distribution value being approximately a median value in the distribution data; and correlating the relative rankings to the distribution data using the median distribution value and the reference point.

6. A computer-implemented method for incorporating a performance evaluation of a selected individual into a determination of a pay target for the selected individual, the selected individual being one of a group of individuals, the computer-implemented method comprising:

obtaining a measure of competency for the selected individual, wherein the measure of competency is determined using the performance evaluation, the measure of competency being arranged to reflect a level of competency of the selected individual;

processing the measure of competency to obtain an overall score, wherein processing the measure of competency includes applying a regression formula to the measure of competency;

producing a ranking for the selected individual with respect to the group of individuals using the overall score;

identifying a reference ranking with respect to the group of individuals;

computing the pay target for the selected individual using the ranking the reference ranking, and distribution data; and displaying the pay target for the selected individual.

7. A computer-implemented method as recited in claim 6 further including:

obtaining a measure of contribution for the selected individual, wherein the measure of contribution is determined using the performance evaluation, the measure of contribution being arranged to reflect a level of contribution by the selected individual; and processing the measure of contribution to obtain the overall score, wherein the regression formula is applied to both the measure of competency and the measure contribution.

8. A computer-implemented method as recited in claim 6 further including:

obtaining a revised ranking for the selected individual with respect to the group of individuals; and replacing the ranking with the revised ranking, wherein computing the pay target for the selected individual includes using the revised ranking.

9. A computer-implemented method as recited in claim 6 wherein computing the pay target for the selected individual further includes:

computing a target market pay value for the selected individual using the ranking and the distribution data; and evaluating the target market pay value and available budget to determine the pay target.

10. A computer-implemented method as recited in claim 9 further including obtaining a revised target market pay value, wherein evaluating the target market pay value and the available budget to determine the pay target includes evaluating the revised target market pay value.

11. A computer system arranged to incorporate results of a performance evaluation of a selected individual into a determination of a pay target for the selected individual, the selected individual being one of a group of individuals, the computer system comprising:

a processor;

a receiving mechanism arranged to receive a measure of competency for the selected individual, wherein the measure of competency is obtained from the performance evaluation, the measure of competency being arranged to reflect a level of competency of the selected individual;

a regression mechanism arranged to process the measure of competency to obtain an overall score using a regression formula, the regression mechanism being coupled with the processor;

a ranking mechanism arranged to produce a ranking for the selected individual with respect to the group of individuals using the overall score, the ranking mechanism further being arranged to identify a reference point with respect to relative rankings associated with the group of individuals;

an evaluator arranged to compute the pay target for the selected individual using the ranking, the reference point, and distribution data; and an output mechanism, the output mechanism arranged to provide a viewable representation of the pay target for the selected individual.

12. A computer system according to claim 11 wherein the receiving mechanism is further arranged to receive a measure of contribution for the selected individual, wherein the measure of contribution is determined using the performance evaluation, the measure of contribution being arranged to reflect a level of contribution by the selected individual, and the regression mechanism is further arranged to process the measure of contribution to obtain the overall score by applying the regression formula to both the measure of competency and the measure of contribution.

13. A computer system according to claim 11 wherein the receiving mechanism is further arranged to receive a revised ranking for the selected individual with respect to the group of individuals, the computer system further including:
   a replacement mechanism arranged to replace the ranking with the revised ranking, wherein the evaluator is further arranged to compute the pay target for the selected individual using the revised ranking.

14. A computer system according to claim 11 wherein the evaluator is further arranged to compute a target market pay value for the selected individual using the ranking and the distribution data, and to evaluate the target market pay value and available budget to determine the pay target.

15. A computer system according to claim 14 wherein the receiving mechanism is further arranged to obtain a revised target market pay value, and the evaluator is further arranged to evaluate the revised target market pay value and the available budget to determine the pay target.

16. A computer system according to claim 11 wherein the receiving mechanism is coupled to a graphical user interface.

17. A computer program product comprising a medium for incorporating a performance evaluation of a selected individual into a determination of a pay target for the selected individual, the selected individual being one of a group of individuals, the medium containing computer-readable codes comprising:
   code that obtains a measure of competency for the selected individual, wherein the measure of competency is determined using the performance evaluation, the measure of competency being arranged to reflect a level of competency of the selected individual;
   code that processes the measure of competency to obtain an overall score, wherein processing the measure of competency includes applying a regression formula to the measure of competency;
   code that produces a ranking for the selected individual with respect to the group of individuals using the overall score;
   code that identifies a reference point with respect to relative ranking associated with the group of individuals;
   code that computes the pay target for the selected individual using the ranking, the reference point and distribution data; and
   code that displays the computer pay target for the selected individual.

18. A computer program product according to claim 17 wherein the medium is one of a data signal embodied in a carrier wave, a tape, a computer disk, and a CD-ROM.

19. A computer program product according to claim 17 further including:
   code that obtains a measure of contribution for the selected individual, wherein the measure of contribution is determined using the performance evaluation, the measure of contribution being arranged to reflect a level of contribution by the selected individual; and
   code that processes the measure of contribution to obtain the overall score, wherein the regression formula is applied to both the measure of competency and the measure of contribution.

20. A computer program product according to claim 17 further including:
   code that obtains a revised ranking for the selected individual with respect to the group of individuals; and
   code that replaces the ranking with the revised ranking, wherein the computer code that computes the pay target for the selected individual includes computer code that uses the revised ranking to compute the pay target.

21. A computer program product according to claim 17 wherein the code that computes the pay target for the selected individual further includes:
   code that computes a target market pay value for the selected individual using the ranking and the distribution data; and
   code that evaluates the target market pay value and available budget to determine the pay target.

22. A computer program product according to claim 21 further including code that obtains a revised target market pay value, wherein the code that evaluates the target market pay value and the available budget to determine the pay target includes code that evaluates the revised target market pay value.

* * * * *